United States Patent
Ueki (10) Patent No.: US 11,837,774 B2
(45) Date of Patent: Dec. 5, 2023

(54) RFID TAG RFIC MODULE SET AND RFID TAG SET

(71) Applicant: Murata Manufacturing Co., Ltd., Nagaokakyo (JP)

(72) Inventor: Noriyuki Ueki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 357 days.

(21) Appl. No.: 17/371,743

(22) Filed: Jul. 9, 2021

(65) Prior Publication Data

US 2021/0336323 A1    Oct. 28, 2021

Related U.S. Application Data

(63) Continuation of application No. PCT/JP2020/036702, filed on Sep. 28, 2020.

(30) Foreign Application Priority Data

Feb. 19, 2020    (JP) .................................. 2020-026564

(51) Int. Cl.
*H01Q 1/22* (2006.01)
*G06K 19/077* (2006.01)
(Continued)

(52) U.S. Cl.
CPC ..... *H01Q 1/2208* (2013.01); *G06K 19/07773* (2013.01); *G06K 19/07783* (2013.01);
(Continued)

(58) Field of Classification Search
CPC .... H01Q 1/2225; H01Q 5/335; H01Q 1/2208; H01Q 7/00; H01Q 9/285;
(Continued)

(56) References Cited

U.S. PATENT DOCUMENTS

| 6,173,900 B1 | 1/2001 | Yoshigi et al. |
| 7,714,794 B2 * | 5/2010 | Tavassoli Hozouri ...................... G06K 19/07749 343/803 |

(Continued)

FOREIGN PATENT DOCUMENTS

| JP | 2000137777 A | 5/2000 |
| JP | 2007213357 A | 8/2007 |

(Continued)

OTHER PUBLICATIONS

International Search Report issued for PCT/JP2020/036702, dated Dec. 8, 2020.

*Primary Examiner* — Vibol Tan
(74) *Attorney, Agent, or Firm* — ArentFox Schiff LLP (57) ABSTRACT

RFID tag RFIC modules are provided with each module including an RFIC, an antenna connection first electrode, an antenna connection second electrode, an RFIC connection first electrode, an RFIC connection second electrode, an impedance matching circuit that matches impedance between the RFIC and an antenna, and a rectangular substrate. A first coil and a second coil of the impedance matching circuit are juxtaposed in/on the substrate, and a straight line passing through center of gravity of the coil opening of the first coil and center of gravity of the coil opening of the second coil is inclined with respect to one side of the substrate, and directions of this inclination are different between the first RFIC module and the second RFIC module.

20 Claims, 10 Drawing Sheets

(51) Int. Cl.
*H01Q 7/00* (2006.01)
*H01Q 5/335* (2015.01)

(52) U.S. Cl.
CPC ............ *H01Q 1/2225* (2013.01); *H01Q 5/335* (2015.01); *H01Q 7/00* (2013.01)

(58) Field of Classification Search
CPC ....... G06K 19/07773; G06K 19/07783; G06K 7/10336; G06K 19/07781; G06K 19/07777; G06K 19/07775; G06K 19/07779; G06K 19/077
See application file for complete search history.

(56) References Cited

U.S. PATENT DOCUMENTS

| | | | |
|---|---|---|---|
| 9,727,765 B2* | 8/2017 | Ikemoto | H01Q 7/00 |
| 9,881,248 B2* | 1/2018 | Kato | H01Q 1/40 |
| 10,108,896 B2* | 10/2018 | Kato | H01F 27/292 |
| 10,971,796 B2* | 4/2021 | Kato | G06K 19/077 |
| 2017/0083804 A1 | 3/2017 | Kato et al. | |
| 2018/0114104 A1 | 4/2018 | Kato et al. | |
| 2019/0386376 A1 | 12/2019 | Kato | |

FOREIGN PATENT DOCUMENTS

| | | | |
|---|---|---|---|
| WO | 2016084658 A1 | 6/2016 | |
| WO | 2018164255 A1 | 9/2018 | |

* cited by examiner

RFID TAG RFIC MODULE SET AND RFID TAG SET

CROSS REFERENCE TO RELATED APPLICATIONS

The present application is a continuation of PCT/JP2020/036702 filed Sep. 28, 2020, which claims priority to Japanese Patent Application No. 2020-026564, filed Feb. 19, 2020, the entire contents of each of which are incorporated herein by reference.

TECHNICAL FIELD

The present invention relates to a set of radio frequency identifier (RFID) tags including a radio frequency integrated circuit (RFIC) and an antenna, and a set of RFIC modules for RFID tags forming a part of the RFID tags.

BACKGROUND

WO 2016/084658 A (hereinafter "Patent Literature 1") discloses an example of an RFID tag including an RFIC module. The RFID tag disclosed therein is formed by mounting an RFIC module on an antenna base material on which an antenna is formed. The RFIC module includes an RFIC and an impedance matching circuit that matches impedance between the RFIC and the antenna.

A situation in which an RFID tag reader reads an RFID tagged article varies depending on the size of the article and the purpose of managing the article. When the RFID tags of a plurality of sheet-like or plate-like articles are read substantially simultaneously, the RFID tags are read with the articles stacked.

However, as disclosed in Patent Literature 1, when an impedance matching circuit that matches impedance between an RFIC and an antenna includes a plurality of coils, adjacent RFID tags may interfere with each other. More specifically, an unwanted coupling between neighboring coils of the impedance matching circuits of the RFID tags might occur, resulting in a failure to implement a predetermined operation of the RFID tag. Thus, RFID tags of a plurality of articles cannot be read under such an adverse condition.

SUMMARY OF THE INVENTION

In view of the above situation of such existing systems, it is an object of the present invention to provide a set of RFIC modules for an RFID tag and a set of RFID tags with which unwanted coupling between coils of an impedance matching circuit for RFID tags close to each other is suppressed to facilitate mutual independence even in a closely arranged state.

Thus, according to an exemplary aspect, an RFID tag RFIC module set is provided that includes a first RFID tag RFIC module and a second RFID tag RFIC module. The first RFID tag RFIC module and the second RFID tag RFIC module each include: an RFIC; an antenna connection first electrode; an antenna connection second electrode; an RFIC connection first electrode; an RFIC connection second electrode; and an impedance matching circuit that is connected to the RFIC connection first electrode and the RFIC connection second electrode, and the antenna connection first electrode and the antenna connection second electrode, and matches impedance between the RFIC and an antenna. Moreover, a rectangular substrate is provided on which the RFIC connection first electrode, the RFIC connection second electrode, the antenna connection first electrode, the antenna connection second electrode, and the impedance matching circuit are formed, and on which the RFIC is mounted. The impedance matching circuit includes a first coil and a second coil that are connected to the RFIC connection first electrode and the RFIC connection second electrode and each have a coil opening extending along a surface of the substrate. The first coil and the second coil are juxtaposed in/on the substrate, and a straight line passing through center of gravity of the coil opening of the first coil and center of gravity of the coil opening of the second coil is inclined with respect to one side of the substrate, and the straight line of the first RFID tag RFIC module and the straight line of the second RFID tag RFIC module have different directions of the inclination.

Moreover, according to an exemplary aspect, an RFID tag RFIC module set is provided that includes a first RFID tag RFIC module and a second RFID tag RFIC module. The first RFID tag RFIC module and the second RFID tag RFIC module each include: an RFIC; an antenna connection first electrode; an antenna connection second electrode; an RFIC connection first electrode; an RFIC connection second electrode; and an impedance matching circuit that is connected to the RFIC connection first electrode and the RFIC connection second electrode, and the antenna connection first electrode and the antenna connection second electrode, and that matches impedance between the RFIC and an antenna. Moreover, a rectangular substrate is provided on which the RFIC connection first electrode, the RFIC connection second electrode, the antenna connection first electrode, the antenna connection second electrode, and the impedance matching circuit are formed, and on which the RFIC is mounted. The impedance matching circuit includes a first coil and a second coil that are connected to the RFIC connection first electrode and the RFIC connection second electrode and each have a coil opening extending along a surface of the substrate. The first coil and the second coil are juxtaposed in/on the substrate, and a straight line passing through center of gravity of the coil opening of the first coil and center of gravity of the coil opening of the second coil passes through a position other than center of the substrate, and a position of the straight line of the first RFID tag RFIC module and a position of the straight line of the second RFID tag RFIC module are different from each other.

According to another exemplary aspect, an RFID tag set is provided that includes a first RFID tag and a second RFID tag. The first RFID tag and the second RFID tag each include: an antenna; an RFIC; an antenna connection first electrode; an antenna connection second electrode; an RFIC connection first electrode; an RFIC connection second electrode; and an impedance matching circuit that is connected to the RFIC connection first electrode and the RFIC connection second electrode, and the antenna connection first electrode and the antenna connection second electrode, and that matches impedance between the RFIC and the antenna. Moreover, a substrate is provided on which at least the RFIC connection first electrode, the RFIC connection second electrode, the antenna connection first electrode, the antenna connection second electrode, and the impedance matching circuit are formed. The impedance matching circuit includes a first coil and a second coil that are connected to the RFIC connection first electrode and the RFIC connection second electrode and each have a coil opening extending along a surface of the substrate. The first coil and the second coil are juxtaposed in/on the substrate, and a straight line passing through center of gravity of the coil opening of the first coil and center of gravity of the coil opening of the second coil is inclined with respect to one side of the substrate. The straight line of the first RFID tag and the straight line of the second RFID tag have different directions of the inclination.

According to another exemplary, an RFID tag set is provided that includes a first RFID tag and a second RFID tag. The first RFID tag and the second RFID tag each include: an antenna; an RFIC; an antenna connection first electrode; an antenna connection second electrode; an RFIC connection first electrode; an RFIC connection second electrode; and an impedance matching circuit that is connected to the RFIC connection first electrode and the RFIC connection second electrode, and the antenna connection first electrode and the antenna connection second electrode, and that matches impedance between the RFIC and the antenna. Moreover, a substrate is provided on which at least the RFIC connection first electrode, the RFIC connection second electrode, the antenna connection first electrode, the antenna connection second electrode, and the impedance matching circuit are formed. The impedance matching circuit includes a first coil and a second coil that are connected to the RFIC connection first electrode and the RFIC connection second electrode and each have a coil opening extending along a surface of the substrate, the first coil and the second coil are juxtaposed in/on the substrate, and a straight line connecting center of gravity of the coil opening of the first coil and center of gravity of the coil opening of the second coil passes through a position other than center of the substrate. Moreover, the straight line of the first RFID tag and the straight line of the second RFID tag have different positions.

The exemplary embodiments of the present invention provide a set of RFID tag RFIC modules and a set of RFID tags with which unwanted coupling between coils of an impedance matching circuit for RFID tags close to each other is suppressed to facilitate mutual independence even when the tags are closely arranged with respect to teach other.

DETAILED DESCRIPTION OF EMBODIMENTS

First Exemplary Embodiment

Figure 1A:
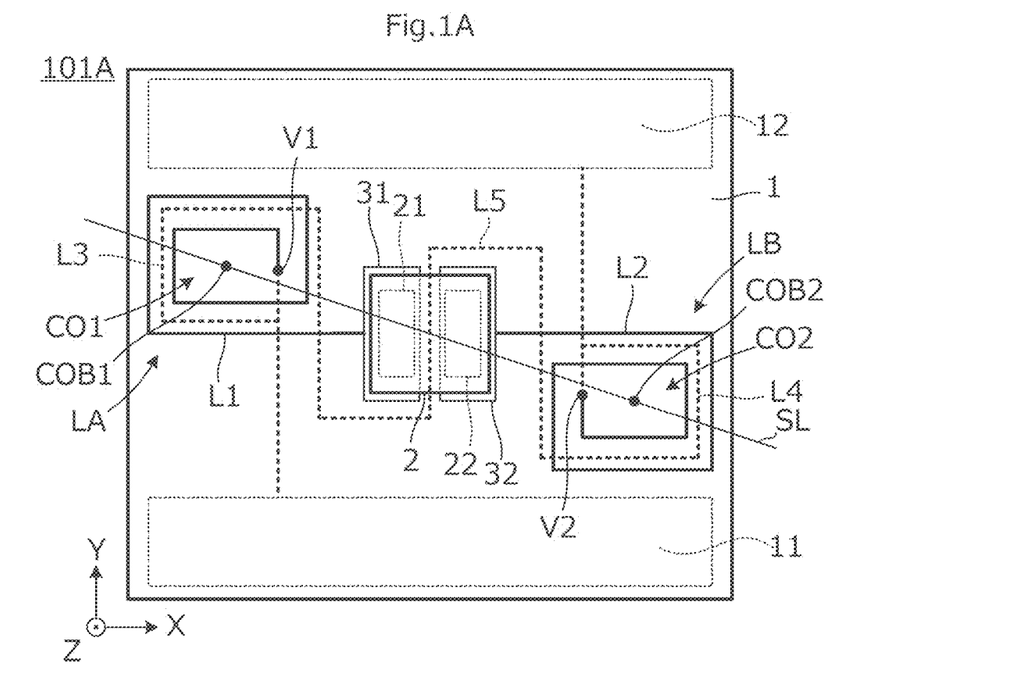
FIG. 1A is an enlarged plan view of a first RFIC module 101A that is one of two types of RFID tag RFIC modules according to a first exemplary embodiment.
Figure 1B:
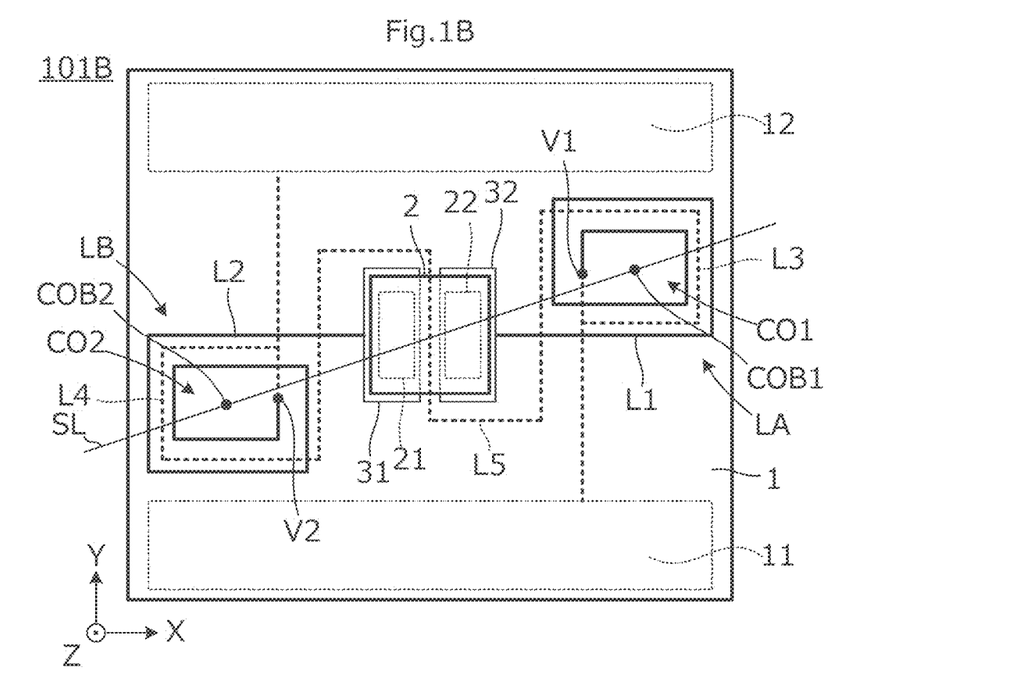
FIG. 1B is an enlarged plan view of a second RFIC module 101B that is the other of the two types.

FIG. 1A is an enlarged plan view of a first RFIC module 101A that is one of two types of RFID tag RFIC modules (hereinafter, simply referred to as an "RFIC module") according to a first embodiment, and FIG. 1B is an enlarged plan view of a second RFIC module 101B that is the other of the two types.

The RFIC modules 101A and 101B each include an RFIC 2, an antenna connection first electrode 11, an antenna connection second electrode 12, an RFIC connection first electrode 31, an RFIC connection second electrode 32, an impedance matching circuit, and a substrate 1.

The impedance matching circuit is connected to the RFIC connection first electrode 31 and the RFIC connection second electrode 32, and the antenna connection first electrode 11 and the antenna connection second electrode 12, and matches the impedance to the RFIC 2 and the antenna.

The RFIC connection first electrode 31, the RFIC connection second electrode 32, the antenna connection first electrode 11, the antenna connection second electrode 12, and the impedance matching circuit are formed on the substrate 1. RFIC terminal electrodes 21 and 22 are formed on a lower surface of the RFIC 2, and the RFIC 2 is mounted on the substrate 1 with the RFIC terminal electrodes 21 and 22 connected to the RFIC connection electrodes 31 and 32. Moreover, in the exemplary aspect, an insulator layer is formed by resin molding covers a mounting surface of the RFIC 2 of the substrate 1. It is noted that FIGS. 1A and 1B are plan views before the resin molding.

The impedance matching circuit includes a first coil LA and a second coil LB that are connected to the RFIC connection first electrode 31 and the RFIC connection second electrode 32 and each have a coil opening extending along the surface of the substrate 1 (e.g., in the Z axis direction). That is, according to the coordinate system illustrated in FIGS. 1A and 1B, the coil winding axis of the first coil LA is parallel to the Z axis, and has the coil opening parallel to the X-Y plane. Similarly, the coil winding axis of the second coil LB is parallel to the Z axis, and the coil opening thereof is parallel to the X-Y plane.

The first coil LA and the second coil LB are juxtaposed in or on the substrate 1. A straight line SL passing through the center of gravity COB1 of a coil opening CO1 of the first coil LA and the center of gravity COB2 of a coil opening CO2 of the second coil LB is parallel to none of the sides of the substrate 1. For purposes of this disclosure, it is noted that the term "center of gravity of the coil opening" is a geometric center of the coil opening in a plan view of the coil opening, and is not a mass center of the conductor forming the coil. In this example, the coil opening CO1 of the first coil LA is a region surrounded by the innermost circumference of the conductor pattern forming the first coil LA, and the coil opening CO2 of the second coil LB is a region surrounded by the innermost circumference of the conductor pattern forming the second coil LB. Moreover, in an exemplary aspect, the straight line SL passes through the coil axis (e.g., at any height in the Z axis) of the coil opening CO1 of the first coil LA and the coil axis (e.g., at any height in the Z axis) of the coil opening CO2 of the second coil LB.

In any event, the first coil LA includes a coil forming a first inductor L1 connected to the RFIC connection first electrode 31 and the antenna connection first electrode 11, and a coil forming a third inductor L3 connected in series between the antenna connection first electrode 11 and the antenna connection second electrode 12. Each of the coils has a spiral shape. The second coil LB includes a coil forming a second inductor L2 connected to the RFIC connection second electrode 32 and the antenna connection second electrode 12, and a coil forming a fourth inductor L4 connected in series between the antenna connection first electrode 11 and the antenna connection second electrode 12. Each of the coils has a spiral shape.

The coil forming the first inductor L1 is formed on the upper surface of the substrate 1, and the coil forming the third inductor L3 is formed on the lower surface of the substrate 1. The coil forming the first inductor L1 and the coil forming the third inductor L3 are connected via an interlayer connection conductor V1. The coil forming the second inductor L2 is formed on the upper surface of the substrate 1, and the coil forming the fourth inductor L4 is formed on the lower surface of the substrate 1. The coil forming the second inductor L2 and the coil forming the fourth inductor L4 are connected via an interlayer connection conductor V2.

The coil forming the third inductor L3 and the coil forming the fourth inductor L4 are connected to each other by a conductor pattern forming a fifth inductor L5.

According to the exemplary aspect, the coil opening of the coil forming the first inductor L1 and the coil opening of the coil forming the third inductor L3 overlap each other (in the Z axis direction), and the coil opening of the coil forming the second inductor L2 and the coil opening of the coil forming the fourth inductor L4 overlap each other (also in the Z axis direction).

The difference between the first RFIC module 101A and the second RFIC module 101B is the direction of inclination of the straight line SL passing through the center of gravity COB1 of the coil opening CO1 of the first coil LA and the center of gravity COB2 of the coil opening CO2 of the second coil LB. In the directions illustrated in FIGS. 1A and 1B, a straight line SL extends in the lower right direction in the first RFIC module 101A, whereas a straight line SL extends in the upper right direction in the second RFIC module 101B.

Figure 2:
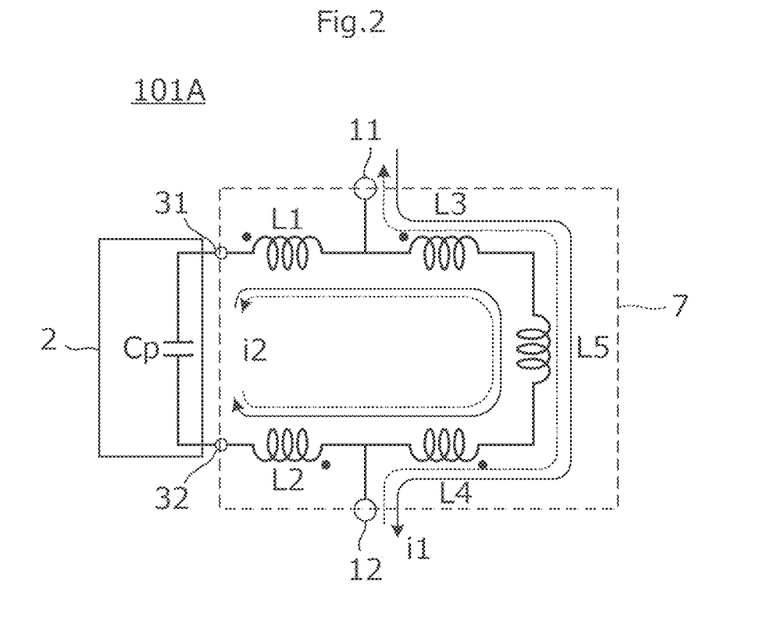
FIG. 2 is a circuit diagram of the RFIC module 101A.

FIG. 2 is a circuit diagram of the RFIC module 101A. The first RFIC module 101A includes the RFIC 2 and an impedance matching circuit 7. As shown, the impedance matching circuit 7 includes the first inductor L1, the second inductor L2, the third inductor L3, the fourth inductor L4, and the fifth inductor L5. In the RFIC 2, there is an equivalent capacitor Cp connected to the RFIC connection first electrode 31 and the RFIC connection second electrode 32. The first inductor L1 and the third inductor L3 are magnetically coupled, and the second inductor L2 and the fourth inductor L4 are magnetically coupled. Dot symbols in FIG. 2 indicate coil winding directions of the respective inductor. The circuit diagram illustrated in FIG. 2 also applies to the second RFIC module 101B.

Figure 3:
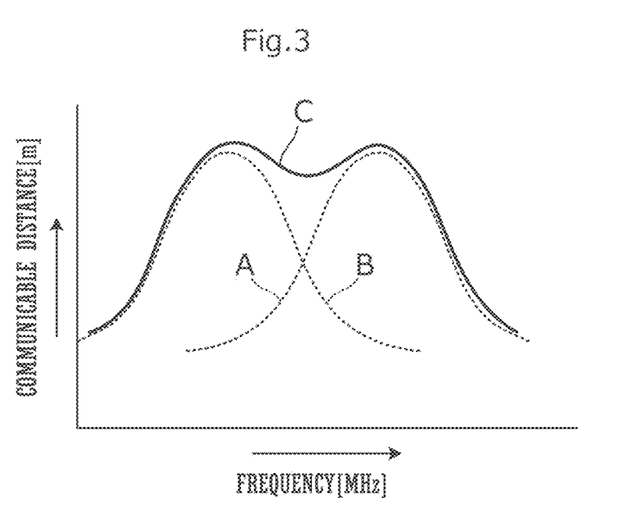
FIG. 3 is a diagram illustrating two resonance frequencies generated by am impedance matching circuit 7 illustrated in FIG. 2.

FIG. 3 is a diagram illustrating two resonance frequencies generated by the impedance matching circuit 7 illustrated in FIG. 2. In the first RFIC module 101A, two resonances occur. The first resonance is a resonance generated in a current path including the antenna 6, the third inductor L3, the fourth inductor L4, and the fifth inductor L5, and a current i1 illustrated in FIG. 2 represents a current flowing through the resonance current path. The second resonance is a resonance generated in a current path including the capacitor Cp, the first inductor L1, the second inductor L2, the third inductor L3, and the fifth inductor L5, and a current i2 illustrated in FIG. 2 represents a current flowing through the resonance current path.

The first resonance and the second resonance are coupled to each other via a third inductor L3, a fourth inductor L4, and a fifth inductor L5. A difference of several tens of MHz (specifically, about 5 to 50 MHz) is generated between the resonance frequency of the first resonance and the resonance frequency of the second resonance. These resonance frequency characteristics are represented by curves A and B in FIG. 3. By combining two resonances having such resonance frequencies, a broadband resonance frequency characteristic as indicated by curve C in FIG. 3 can be obtained.

Figure 4A:
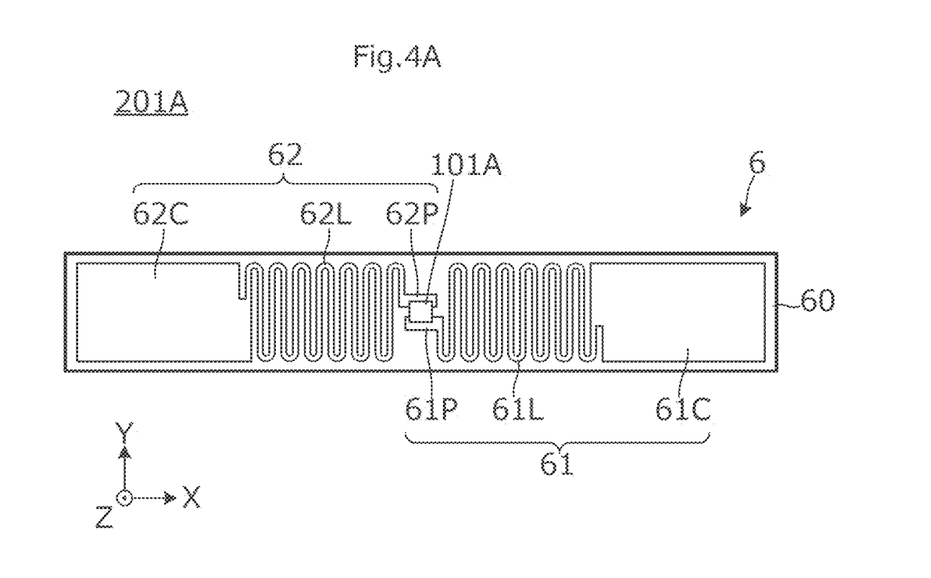
FIG. 4A is a plan view of a first RFID tag 201A.
Figure 4B:
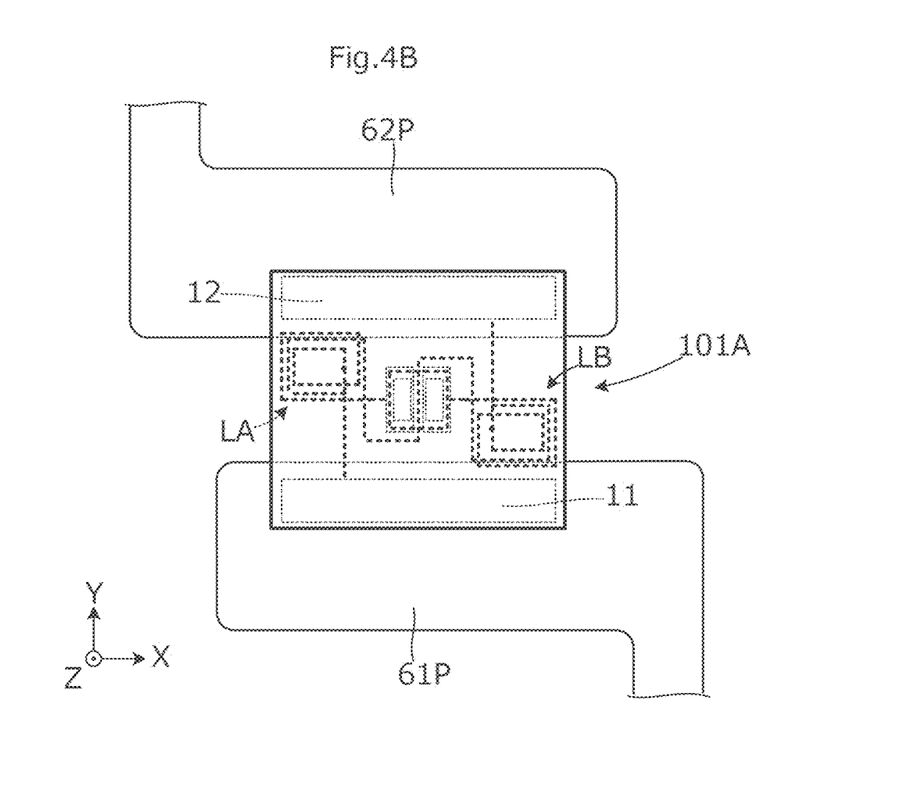
FIG. 4B is an enlarged plan view of a portion of the first RFID tag 201A on which the first RFIC module 101A is mounted.
Figure 5A:
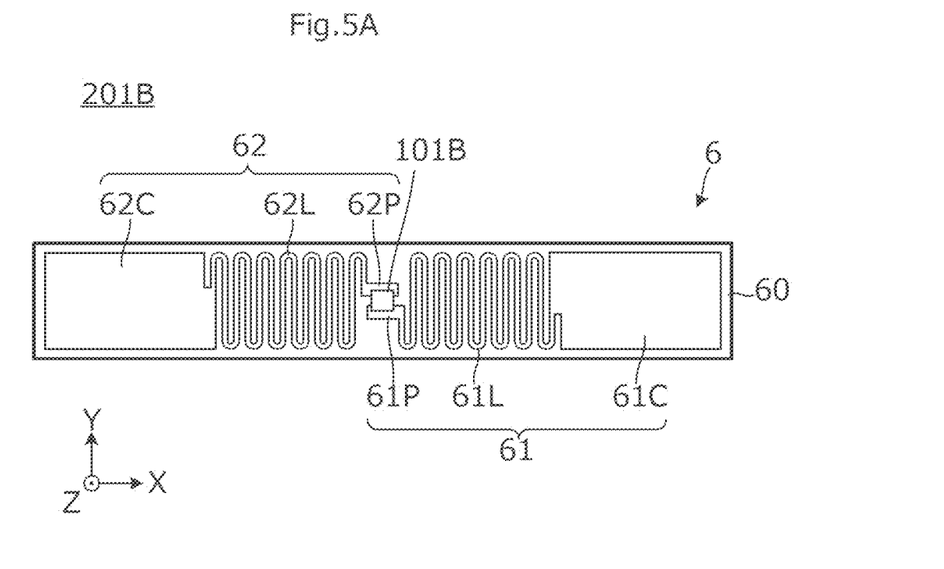
FIG. 5A is a plan view of a second RFID tag 201B.
Figure 5B:
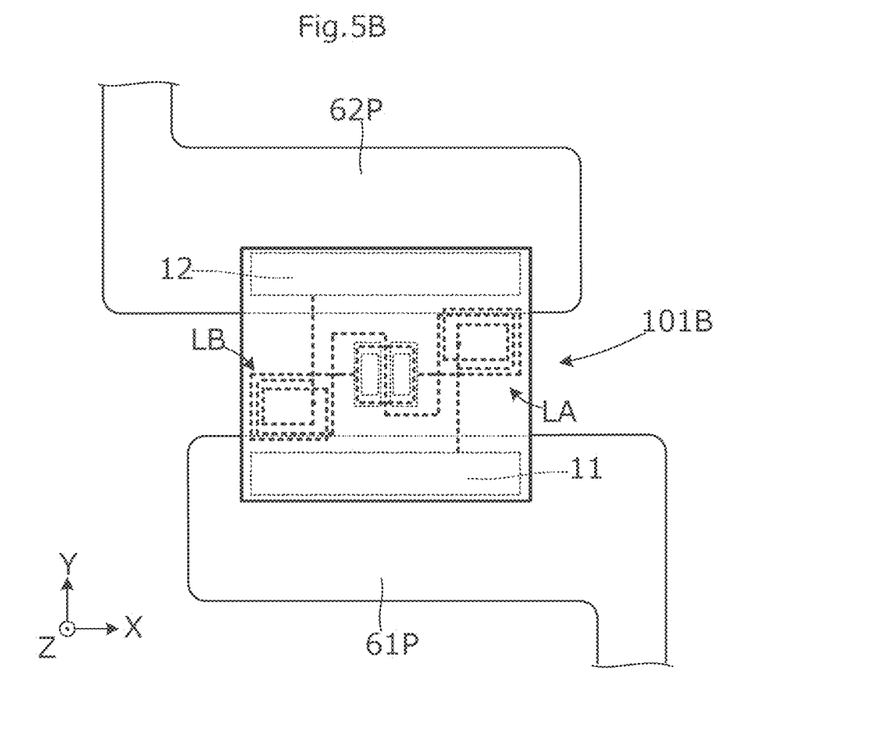
FIG. 5B is an enlarged plan view of a portion of the second RFID tag 201B on which the second RFIC module 101B is mounted.

FIG. 4A is a plan view of the first RFID tag 201A, and FIG. 4B is an enlarged plan view of a portion of the first RFID tag 201A on which the first RFIC module 101A is mounted. FIG. 5A is a plan view of a second RFID tag 201B, and FIG. 5B is an enlarged plan view of a portion of the second RFID tag 201B on which the second RFIC module 101B is mounted.

The first RFID tag 201A includes an antenna 6 and the first RFIC module 101A coupled to the antenna 6. The antenna 6 includes an insulator film 60 and antenna conductor patterns 61 and 62 formed on the insulator film 60.

As further shown, the antenna conductor pattern 61 includes conductor patterns 61P, 61L, and 61C, and the antenna conductor pattern 62 includes conductor patterns 62P, 62L, and 62C. The antenna conductor patterns 61 and 62 form a dipole antenna.

The first RFIC module 101A is mounted on the conductor patterns 61P and 62P of the first RFID tag 201A. An insulating layer is formed between the conductor pattern 61P and the antenna connection first electrode 11, and the conductor pattern 61P and the antenna connection first electrode 11 are capacitively coupled to each other. Similarly, an insulating layer is formed between the conductor pattern 62P and the antenna connection second electrode 12, and the conductor pattern 62P and the antenna connection second electrode 12 are capacitively coupled to each other.

As further shown, the conductor patterns 61L and 62L have a meander line shape and serve as (i.e., are configured as) a high inductance component region. On the other hand, the conductor patterns 61C and 62C have a planar shape and serve as (i.e., are configured as) a high capacitance component region. With this configuration, the formation region where the antenna conductor patterns 61 and 62 are formed is downsized, with an inductance component provided in a high current intensity region increased and with a capacitance component provided in a high voltage intensity region increased.

The configuration of the antenna 6 is the same between the first RFID tag 201A illustrated in FIG. 4A and the second RFID tag 201B illustrated in FIG. 5A. When the first RFIC module 101A is mounted on the insulator film 60, the first RFID tag 201A is formed, and when the second RFIC module 101B is mounted on the insulator film 60, the second RFID tag 201B is formed. The sides of the RFIC modules 101A and 101B in the X-axis direction are parallel to the sides of the insulator film 60 in the X-axis direction.

Figure 6A:
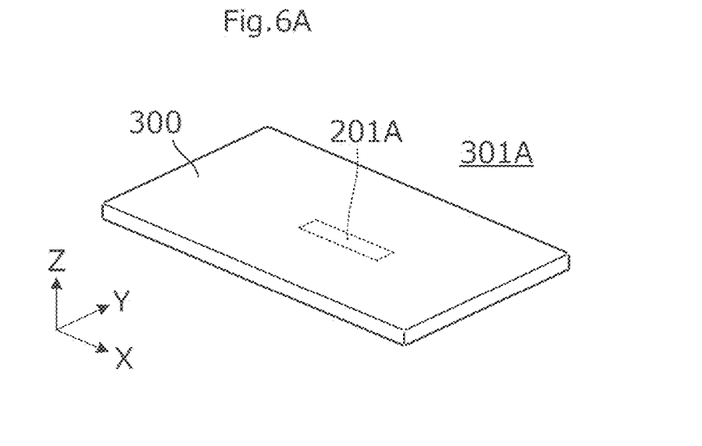
FIG. 6A is a perspective view of an RFID tagged article 301A.
Figure 6B:
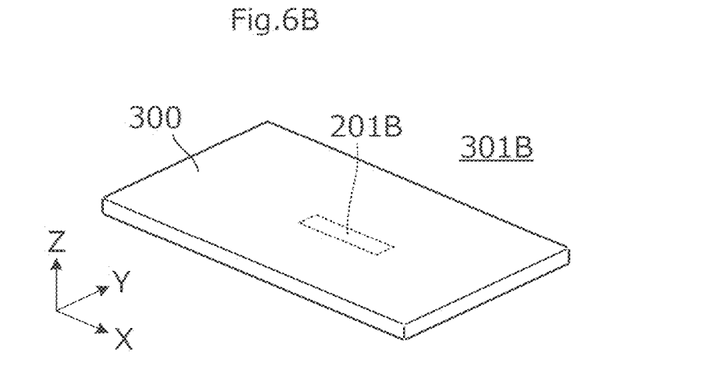
FIG. 6B is a perspective view of an RFID tagged article 301B.

FIG. 6A is a perspective view of an RFID tagged article 301A, and FIG. 6B is a perspective view of an RFID tagged article 301B. The RFID tagged article 301A includes an article 300 and the first RFID tag 201A provided inside the article, and the RFID tagged article 301B includes an article 300 and a second RFID tag 201B provided inside the article. In this example, the articles are card-like articles, and information on the card is written in the RFID tags 201A and 201B according to exemplary aspects.

Figure 7:
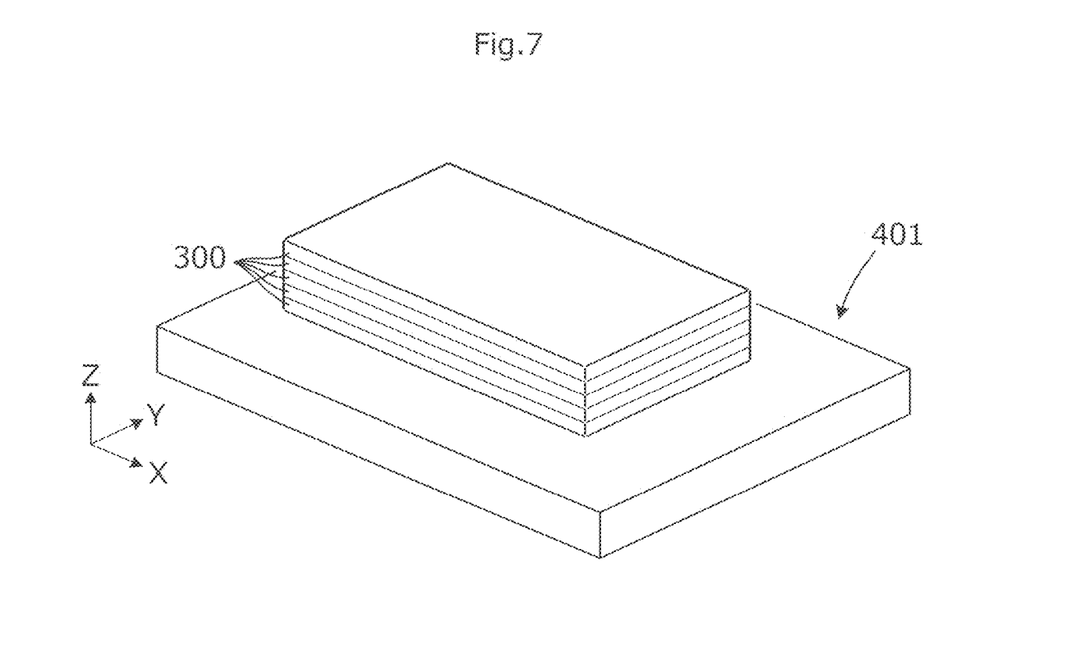
FIG. 7 is a perspective view illustrating a state in which a plurality of articles 300 are placed on an RFID tag reader 401 in a stacked manner.

FIG. 7 is a perspective view illustrating a state in which a plurality of articles 300 are placed on an RFID tag reader 401 in a stacked manner. In the state where the plurality of articles 300 are thus placed on the RFID tag reader 401 in the stacked manner, the RFID tag reader 401 reads information on the RFID tags provided in the plurality of articles 300. In operation, a user tends to place the articles on the reading surface of the RFID tag reader 401 with their respective sides neatly and precisely aligned, especially when the articles are card-like articles with the same size.

Figure 8A:
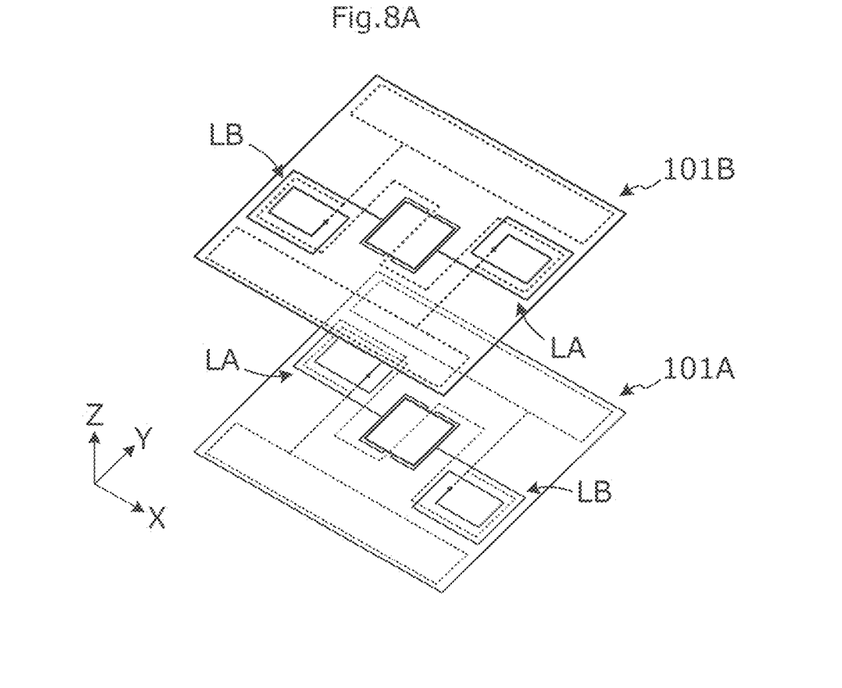
FIGS. 8A and 8B illustrate examples of an overlapping state of the RFIC modules in the RFID tags in the two articles adjacent in the lamination direction in a state where the plurality of articles 300 are stacked as illustrated in FIG. 7.
Figure 8B:
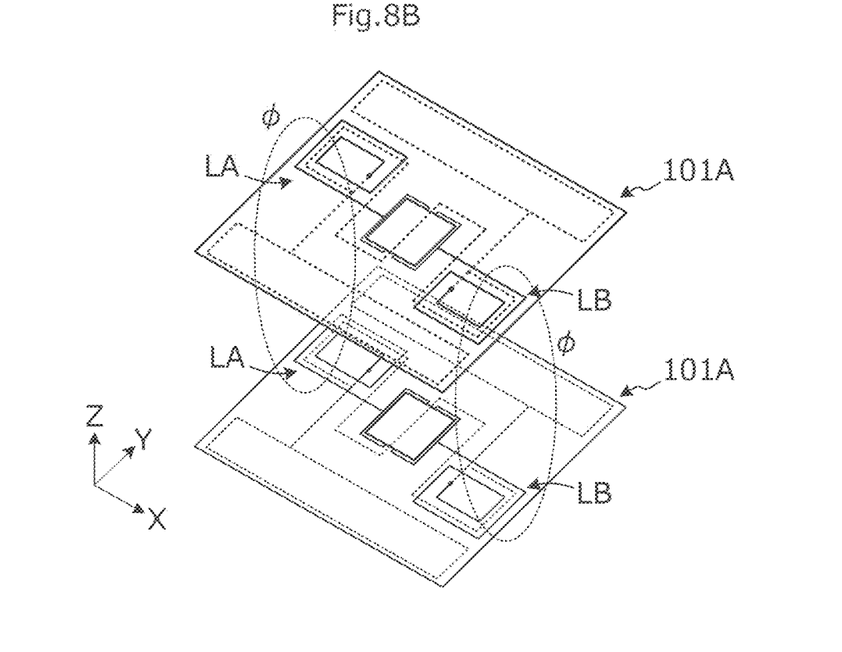

FIGS. 8A and 8B illustrate examples of an overlapping state of the RFIC modules in the RFID tags in the two articles adjacent in the lamination direction in a state where the plurality of articles 300 are stacked as illustrated in FIG. 7.

In the example illustrated in FIG. 8A, the first RFIC module 101A and the second RFIC module 101B are adjacent to each other in the lamination direction. In this state, the first coil LA of the first RFIC module 101A does not overlap (in the Z axis direction) any of the first coil LA and the second coil LB of the second RFIC module 101B, and the second coil LB of the first RFIC module 101A also does not overlap any of the first coil LA and the second coil LB of the second RFIC module 101B. In this example, unwanted coupling between two coils of the adjacent RFIC modules is suppressed.

In the example illustrated in FIG. 8B, the first RFIC module 101A and the second RFIC module 101A are adjacent to each other in the lamination direction. In this state, the first coil LA of one first RFIC module 101A overlaps the first coil LA of the other first RFIC module 101A, and the second coil LB of one first RFIC module 101A overlaps the second coil LB of the other first RFIC module 101A. This example involves a certain amount of unwanted coupling between two coils of the adjacent RFIC modules is suppressed. This is conceptually illustrated by a magnetic flux φ in FIG. 8B.

Figure 10:
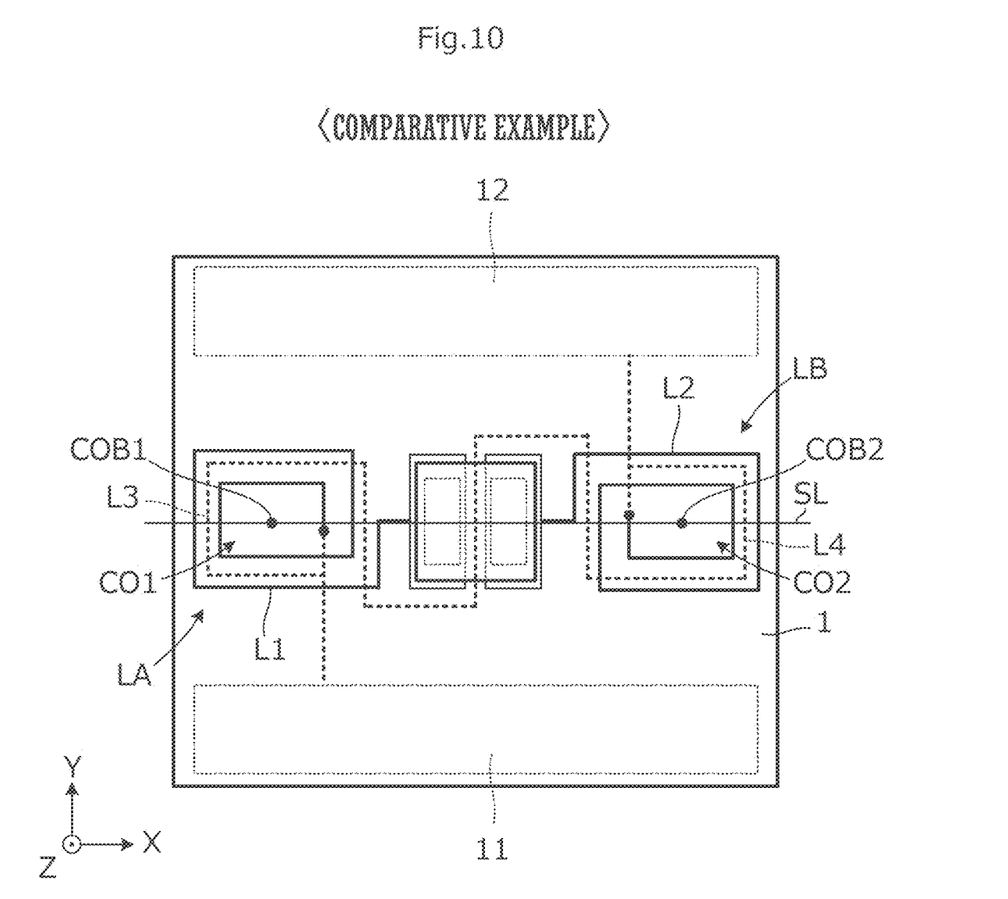
FIG. 10 is a plan view of an RFIC module of a comparative example.

Now, a plan view of an RFIC module of a comparative example is illustrated in FIG. 10. In the RFIC module of the comparative example, a straight line SL passing through the center of gravity COB1 of the coil opening CO1 of the first coil LA and the center of gravity COB2 of the coil opening CO2 of the second coil LB is parallel to two sides of the substrate 1. Therefore, when the articles, which have the RFID tags having the RFIC modules attached thereto, overlap with each other, unwanted coupling between the two coils adjacent in the lamination direction occurs. The same occurs even when the article is horizontally reversed, vertically reversed, or rotated by 180 degrees.

According to the present embodiment, since there are two types of arrangements of the two coils LA and LB of the impedance matching circuit, the possibility of the state illustrated in FIG. 8B being established decreases. For example, when the four card-shaped articles are placed on the RFID tag reader 401 in a neatly aligned manner, the probability that unwanted coupling between the two coils of the impedance matching circuits adjacent in the lamination direction occurs is 2/16. There are 16 possible combinations of two directions of the coils LA and LB of the four RFID tags, and among them, there are only two combinations in which the directions of the coils LA and LB of the imped-ance matching circuits adjacent in the lamination direction are all aligned. In other words, probability that any RFID tag or all RFID tags can be read is remaining 14/16. Furthermore, it can be recognized that there is a card that can be read based on the number of cards that are successfully read. Thus, in that case, the combination among cards can be changed by simply shuffling the card or placing them again, whereby the probability that all the RFID tags can be read at once can be increased.

Second Exemplary Embodiment

In the second embodiment, an RFIC module in which the arrangement structure of the first coil LA and the second coil LB with respect to the substrate is different from that of the first embodiment will be exemplified.

Figure 9A:
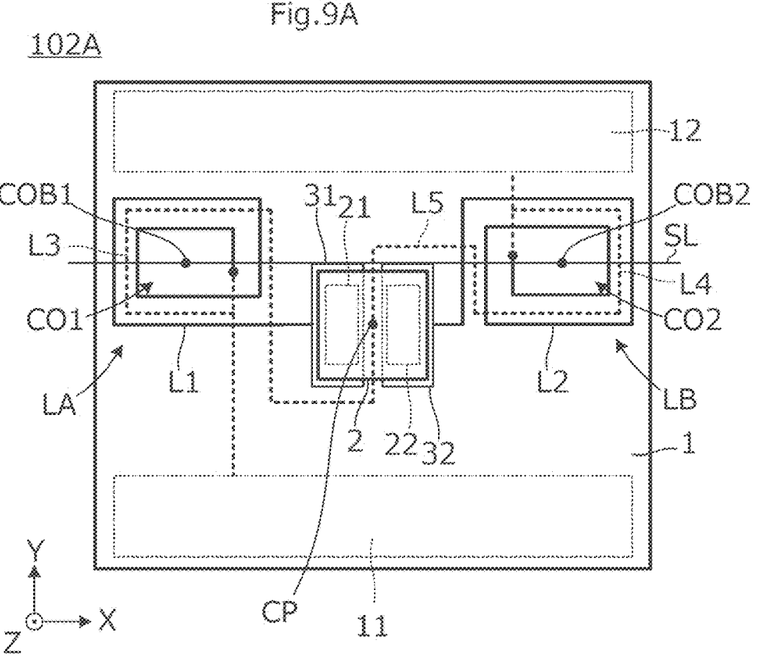
FIG. 9A is an enlarged plan view of a first RFIC module 102A which is one of the two types of RFIC modules according to the second exemplary embodiment.
Figure 9B:
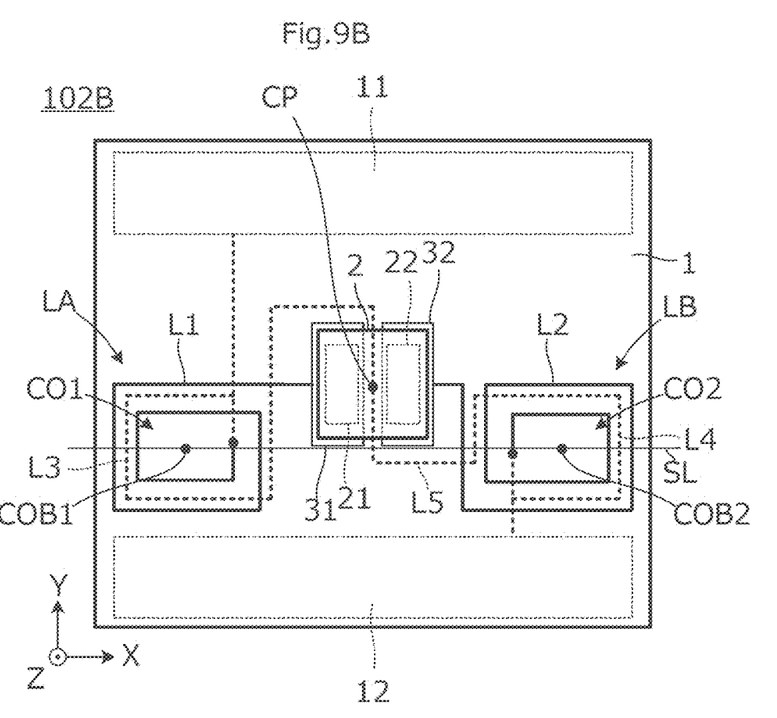
FIG. 9B is an enlarged plan view of a second RFIC module 102B which is the other of the two types.

FIG. 9A is an enlarged plan view of a first RFIC module 102A which is one of the two types of RFIC modules according to the second embodiment, and FIG. 9B is an enlarged plan view of a second RFIC module 102B which is the other of the two types.

The RFIC modules 102A and 102B each include an RFIC 2, an antenna connection first electrode 11, an antenna connection second electrode 12, an RFIC connection first electrode 31, an RFIC connection second electrode 32, an impedance matching circuit, and a substrate 1. The arrangement relationship between the first coil LA and the second coil LB is different from the example in the first embodiment illustrated in FIGS. 1A and 1B.

The first coil LA and the second coil LB are juxtaposed on the substrate 1 in the first RFIC module 102A. As shown, a straight line SL passing through the center of gravity COB1 of the coil opening CO1 of the first coil LA and the center of gravity COB2 of the coil opening CO2 of the second coil LB passes through a position other than the center CP of the substrate 1 (i.e., relative to the X-Y plane).

Also in the second RFIC module 102B, the first coil LA and the second coil LB are juxtaposed in/on the substrate 1. A straight line SL passing through the center of gravity COB1 of the coil opening CO1 of the first coil LA and the center of gravity COB2 of the coil opening CO2 of the second coil LB passes through a position other than the center CP of the substrate 1 (i.e., relative to the X-Y plane).

The difference between the first RFIC module 102A and the second RFIC module 102B is the position of the straight line SL passing through the center of gravity COB1 of the coil opening CO1 of the first coil LA and the center of gravity COB2 of the coil opening CO2 of the second coil LB. In the directions illustrated in FIGS. 9A and 9B, the straight line SL is located at a position closer to the upper side of the substrate 1 in the first RFIC module 102A, whereas the straight line SL is located at a position closer to the lower side of the base material 1 in the second RFIC module 102B.

With the second embodiment, when the first RFIC module 102A and the second RFIC module 102B are adjacent to each other in the lamination direction, unwanted coupling between the first coils LA and between the second coils LB is avoided.

As described above, according to the exemplary embodiments of the present invention, unwanted coupling between coils of adjacent RFIC modules is suppressed, and an RFID tag having high independence can be obtained as in the embodiments described above.

Finally, it is noted that the above description of the embodiments is illustrative in all respects and not restrictive. Those skilled in the art can make modifications and changes as appropriate.

For example, a structure in which the inclination directions of the straight line SL passing through the center of gravity COB1 of the coil opening CO1 of the first coil LA and the center of gravity COB2 of the coil opening CO2 of the second coil LB are made different as described in the first embodiment and a structure in which the positions of the straight line SL passing through the center of gravity COB1 of the coil opening CO1 of the first coil LA and the center of gravity COB2 of the coil opening CO2 of the second coil LB are made different as described in the second embodiment may be combined. As a result, three or more kinds of RFIC modules and an RFID tag including the RFIC modules may be formed.

In another example, in any of the embodiments described above, the impedance matching circuit includes the first inductor L1, the second inductor L2, the third inductor L3, the fourth inductor L4, and the fifth inductor L5, but the present invention is not limited to this configuration of inductors.

In addition, an example in which the first coil LA includes the coil for the first inductor L1 and the coil for the third inductor L3, and the second coil LB includes the coil for the second inductor L2 and the coil for the fourth inductor L4 is described, but the present invention is not limited to this configuration. For example, alternative embodiments of the present invention can be similarly applied to a case where each of the first coil LA and the second coil LB is made up of a single coil.

Furthermore, an example is described in which in the RFIC modules 101A, 101B, 102A, and 102B, a capacitor is formed between the antenna connection first electrode 11 and the antenna conductor pattern 61P, and a capacitor is formed between the antenna connection second electrode 12 and the antenna conductor pattern 62P. However, it is noted that the "connection" is not limited to connection via the capacitor, and may be direct current connection.

In addition to the structure in which the RFIC modules 101A, 101B, 102A, and 102B are mounted on the insulator film 60, the RFIC 2 may be mounted with the impedance matching circuit 7 directly formed on the insulator film 60.

REFERENCE SIGNS LIST

CO1, CO2 coil opening
COB1, COB2 center of gravity
Cp capacitor
CP center of substrate 1
L1 first inductor
L2 second inductor
L3 third inductor
L4 fourth inductor
L5 fifth inductor
LA first coil
LB second coil
SL straight line
V1, V2 interlayer connection conductor
1 substrate
2 RFIC
6 antenna
7 impedance matching circuit
11 antenna connection first electrode
12 antenna connection second electrode
21, 22 RFIC terminal electrode
31 RFIC connection first electrode
32 RFIC connection second electrode
60 insulator film
61, 62 antenna conductor pattern
61P, 61L, 61C, 62P, 62L, 62C conductor pattern
101A, 101B, 102A, 102B RFIC module
201A, 201B RFID tag
300 article
301A, 301B RFID tagged article
401 RFID tag reader

The invention claimed is:

1. An RFID tag RFIC module set comprising:
a first RFID tag RFIC module; and
a second RFID tag RFIC module,
wherein each of the first and second RFID tag RFIC modules includes:
a rectangular substrate;
an RFIC mounted on the rectangular substrate;
an antenna connection first electrode;
an antenna connection second electrode;
an RFIC connection first electrode;
an RFIC connection second electrode; and
an impedance matching circuit that is connected to the RFIC connection first and second electrodes and to the antenna connection first and second electrodes, and that matches impedance between the RFIC and an antenna,
wherein each of the RFIC connection first and second electrodes, the antenna connection first and second electrodes, and the impedance matching circuit are formed on the rectangular substrate,
wherein the impedance matching circuit includes a first coil and a second coil that are connected to the RFIC connection first electrode and the RFIC connection second electrode, with the first and second coils each having a coil opening that extends along a surface of the substrate,
wherein the first coil and the second coil are juxtaposed in or on the rectangular substrate,
wherein a straight line passing through a center of gravity of the coil opening of the first coil and a center of gravity of the coil opening of the second coil is inclined with respect to one side of the rectangular substrate, and
wherein an orientation of the straight line of the first RFID tag RFIC module is different than an orientation of the straight line of the second RFID tag RFIC module.

2. The RFID tag RFIC module set according to claim 1, wherein the orientation of the straight line of the first RFID tag RFIC module has a different direction of inclination than the straight line of the second RFID tag RFIC module.

3. The RFID tag RFIC module set according to claim 1, wherein a position of the straight line of the first RFID tag RFIC module is different than a position of the straight line of the second RFID tag RFIC module.

4. The RFID tag RFIC module set according to claim 1, wherein the first coil includes a coil forming a first inductor connected to the RFIC connection first electrode and the antenna connection first electrode and a coil forming a third inductor connected in series between the antenna connection first electrode and the antenna connection second electrode, and
wherein the second coil includes a coil forming a second inductor connected to the RFIC connection second electrode and the antenna connection second electrode and a coil forming a fourth inductor connected in series between the antenna connection first electrode and the antenna connection second electrode.

5. The RFID tag RFIC module set according to claim 4, wherein a coil opening of the first inductor and a coil opening of the third inductor overlap each other in a direction orthogonal to the surface of the substrate, and wherein a coil opening of the second inductor and a coil opening of the fourth inductor overlap each other in the direction orthogonal to the surface of the substrate.

6. The RFID tag RFIC module set according to claim 4, wherein the first and second inductors are disposed on an first surface of the substrate and the third and fourth inductors are disposed on a second surface of the substrate that is opposite the first surface.

7. The RFID tag RFIC module set according to claim 6, wherein the first inductor is connected to the third inductor by a first interlayer connection conductor extending through the substrate, and the second inductor is connected to the fourth inductor through a second interlayer connection conductor extending through the substrate.

8. An RFID tag RFIC module set comprising:
a first RFID tag RFIC module; and
a second RFID tag RFIC module,
wherein each of the first and the second RFID tag RFIC modules include:
  a rectangular substrate;
  an RFIC mounted on the rectangular substrate;
  an antenna connection first electrode;
  an antenna connection second electrode;
  an RFIC connection first electrode;
  an RFIC connection second electrode; and
  an impedance matching circuit that is connected to the RFIC connection first and second electrodes and to the antenna connection first and second electrodes, and that matches impedance between the RFIC and an antenna,
wherein each of the RFIC connection first and second electrodes, the antenna connection first and second electrodes, and the impedance matching circuit are formed on the rectangular substrate,
wherein the impedance matching circuit includes a first coil and a second coil that are connected to the RFIC connection first electrode and the RFIC connection second electrode, with the first and second coils each having a coil opening with an axis that intersects a surface of the substrate,
wherein the first coil and the second coil are juxtaposed in or on the rectangular substrate,
wherein a straight line passing through the coil opening of the first coil and the coil opening of the second coil is inclined with respect to one side of the rectangular substrate, and
wherein a position or an angle of inclination of the straight line of the first RFID tag RFIC module is different than a position or an angle of inclination of the straight line of the second RFID tag RFIC module.

9. The RFID tag RFIC module set according to claim 8, wherein the straight line of the first RFID tag RFIC module has a different direction of the angle of inclination than the straight line of the second RFID tag RFIC module.

10. The RFID tag RFIC module set according to claim 8, wherein a position of the straight line of the first RFID tag RFIC module is different than a position of the straight line of the second RFID tag RFIC module.

11. The RFID tag RFIC module set according to claim 8, wherein the first coil includes a coil forming a first inductor connected to the RFIC connection first electrode and the antenna connection first electrode and a coil forming a third inductor connected in series between the antenna connection first electrode and the antenna connection second electrode, and
wherein the second coil includes a coil forming a second inductor connected to the RFIC connection second electrode and the antenna connection second electrode and a coil forming a fourth inductor connected in series between the antenna connection first electrode and the antenna connection second electrode.

12. The RFID tag RFIC module set according to claim 11, wherein a coil opening of the first inductor and a coil opening of the third inductor overlap each other in a direction orthogonal to the surface of the substrate, and
wherein a coil opening of the second inductor and a coil opening of the fourth inductor overlap each other in the direction orthogonal to the surface of the substrate.

13. The RFID tag RFIC module set according to claim 11, wherein the first and second inductors are disposed on an first surface of the substrate and the third and fourth inductors are disposed on a second surface of the substrate that is opposite the first surface.

14. The RFID tag RFIC module set according to claim 13, wherein the first inductor is connected to the third inductor by a first interlayer connection conductor extending through the substrate, and the second inductor is connected to the fourth inductor through a second interlayer connection conductor extending through the substrate.

15. An RFID tag set at least comprising:
a first RFID tag; and
a second RFID tag,
wherein each of the first and second RFID tags includes:
  an antenna;
  a substrate;
  an RFIC mounted to the substrate;
  an antenna connection first electrode;
  an antenna connection second electrode;
  an RFIC connection first electrode;
  an RFIC connection second electrode; and
  an impedance matching circuit that is connected to the RFIC connection first and second electrodes, and to the antenna connection first and second electrodes, and that matches impedance between the RFIC and the antenna,
wherein the RFIC connection first and second electrodes, the antenna connection first and second electrodes, and the impedance matching circuit are formed on the substrate,
wherein the impedance matching circuit includes a first coil and a second coil that are connected to the RFIC connection first and second electrodes and that each has a coil opening extending along a surface of the substrate,
wherein the first coil and the second coil are juxtaposed in or on the substrate,
wherein a straight line passing through a center of gravity of the coil opening of the first coil and a center of gravity of the coil opening of the second coil is inclined with respect to one side of the substrate, and
wherein an orientation of the straight line of the first RFID tag is different than an orientation of the straight line of the second RFID tag.

16. The RFID tag set according to claim 15, wherein the orientation of the straight line of the first RFID tag has a different direction of inclination than the straight line of the second RFID tag.

17. The RFID tag set according to claim 15, wherein a position of the straight line of the first RFID tag is different than a position of the straight line of the second RFID tag.

18. The RFID tag set according to claim 15,
wherein the first coil includes a coil forming a first inductor connected to the RFIC connection first electrode and the antenna connection first electrode and a coil forming a third inductor connected in series between the antenna connection first electrode and the antenna connection second electrode, and
wherein the second coil includes a coil forming a second inductor connected to the RFIC connection second electrode and the antenna connection second electrode and a coil forming a fourth inductor connected in series between the antenna connection first electrode and the antenna connection second electrode.

19. The RFID tag set according to claim 18,
wherein a coil opening of the first inductor and a coil opening of the third inductor overlap each other in a direction orthogonal to the surface of the substrate, and
wherein a coil opening of the second inductor and a coil opening of the fourth inductor overlap each other in the direction orthogonal to the surface of the substrate.

20. The RFID tag set according to claim 15, wherein the antenna includes an insulator film and a conductor pattern formed on the insulator film, and the substrate is mounted on the insulator film.

* * * * *